(12) United States Patent
Conde et al.

(10) Patent No.: US 9,752,570 B2
(45) Date of Patent: Sep. 5, 2017

(54) VARIABLE DISPLACEMENT COMPRESSOR AND EXPANDER

(71) Applicant: S-RAM Dynamics, Franklin, TN (US)

(72) Inventors: Ricardo Conde, New Salem, MA (US); Richard Kruse, Fort Calhoun, NE (US); Lee Jestings, Franklin, TN (US)

(73) Assignee: S-RAM Dynamics, Franklin, TN (US)

( * ) Notice: Subject to any disclaimer, the term of this patent is extended or adjusted under 35 U.S.C. 154(b) by 348 days.

(21) Appl. No.: 14/180,223

(22) Filed: Feb. 13, 2014

(65) Prior Publication Data
US 2015/0226209 A1 Aug. 13, 2015

(51) Int. Cl.
| | | |
|---|---|---|
| F04B 49/12 | (2006.01) |
| F04B 1/32 | (2006.01) |
| F16F 15/32 | (2006.01) |
| F16F 15/34 | (2006.01) |
| F16F 15/28 | (2006.01) |
| F04B 1/29 | (2006.01) |
| F01B 3/00 | (2006.01) |
| F04B 27/10 | (2006.01) |

(52) U.S. Cl.
CPC .......... F04B 49/125 (2013.01); F01B 3/0023 (2013.01); F04B 1/295 (2013.01); F04B 1/324 (2013.01); F04B 27/1072 (2013.01); F16F 15/28 (2013.01); F16F 15/286 (2013.01); F16F 15/322 (2013.01); F16F 15/34 (2013.01); Y10T 74/18336 (2015.01)

(58) Field of Classification Search
CPC .. F04B 1/324; F04B 1/295; F04B 1/16; F04B 27/1072; F04B 49/125; F16F 15/34; F16F 15/322; F16F 15/286; F16F 15/28; Y10T 74/18208; Y10T 74/18336; Y10T 403/32631; Y10T 403/32681; Y10T 403/32861; F01B 3/0023; F01B 3/0082; F01B 3/0085
USPC ........................................................... 91/506
See application file for complete search history.

(56) References Cited

U.S. PATENT DOCUMENTS

| | | | |
|---|---|---|---|
| 3,650,434 A * | 3/1972 | Johnson .................. | F04B 1/295 222/23 |
| 3,930,758 A | 1/1976 | Park | |
| 4,011,842 A | 3/1977 | Davies et al. | |
| 4,174,191 A | 11/1979 | Roberts | |
| 4,495,855 A * | 1/1985 | Murakami ............... | F01B 3/02 417/269 |
| 5,002,466 A | 3/1991 | Inagaki et al. | |
| 5,243,938 A | 9/1993 | Yan | |
| 5,275,087 A | 1/1994 | Akuzawa et al. | |
| 5,282,725 A | 2/1994 | Shimizu | |
| 5,535,709 A | 7/1996 | Yoshizawa | |

(Continued)

*Primary Examiner* — Logan Kraft
(74) *Attorney, Agent, or Firm* — Morriss O'Bryant Compagni Cannon, PLLC

(57) ABSTRACT

A variable displacement piston assembly including a plurality of cylinders, each cylinder having an axis substantially parallel to the axis of the other cylinders, a plurality of pistons, one piston in each cylinder, and each piston and corresponding cylinder having a displacement. The assembly also including a transition arm having a connector pin for each piston, each connector pin connecting each piston to said transition arm, a drive shaft connected to the transition arm and a control shaft rotatably coupled to the drive shaft, the control shaft being movable to adjust the displacement of the piston assembly.

30 Claims, 8 Drawing Sheets

(56) References Cited

U.S. PATENT DOCUMENTS

| | | | |
|---|---|---|---|
| 5,868,556 A | 2/1999 | Umemura | |
| 5,890,413 A | 4/1999 | Bayer et al. | |
| 6,675,475 B2 | 1/2004 | Sugiura et al. | |
| 7,011,469 B2 * | 3/2006 | Sanderson | F01B 3/0082 403/128 |
| 7,178,449 B2 | 2/2007 | Porel | |
| 7,185,578 B2 | 3/2007 | Sanderson | |
| 7,281,465 B2 * | 10/2007 | Cochran | F04B 27/0886 427/301 |
| 7,448,806 B2 | 11/2008 | Ishiguro et al. | |
| 7,757,597 B2 | 7/2010 | Lee et al. | |
| 7,771,175 B2 | 8/2010 | Ota et al. | |
| 8,459,962 B2 | 6/2013 | Lee et al. | |
| 2002/0092151 A1 | 7/2002 | Sugiura et al. | |
| 2002/0166611 A1 | 11/2002 | Sugiura et al. | |
| 2003/0005821 A1 | 1/2003 | Ota et al. | |
| 2003/0010195 A1 | 1/2003 | Stolzer | |
| 2003/0121412 A1 | 7/2003 | Sugiura et al. | |
| 2005/0037877 A1 | 2/2005 | Ishiguro et al. | |
| 2006/0005698 A1 | 1/2006 | Porel | |
| 2009/0101089 A1 | 4/2009 | Stephens | |

* cited by examiner

VARIABLE DISPLACEMENT COMPRESSOR AND EXPANDER

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The invention relates to a variable displacement piston assembly, and to a compressor that can adjust piston stroke during operation, while maintaining low head clearance, and includes a universal joint for converting rotary motion to linear motion of the pistons.

Conventional compression systems often include a constant or variable speed motor. However, variable frequency motors or drive systems can be costly or inefficient. Alternatively, some conventional compressor systems include a constant speed motor with a compressor that can have an adjustable displacement. However, often, such variable compressors require stopping operation of the compressor to adjust the piston stroke, creating inefficiencies in the system.

In demand, is a system that will allow a compressor to run at constant speed while still being able to control capacity. Such technology can allow the use of a constant speed motor eliminating the need for variable frequency drives. Such a compressor could run at maximum efficiency at all operating conditions.

Many piston driven systems have pistons that are attached to offset portions of a crankshaft such that as the pistons are moved in a reciprocal direction transverse to the axis of the crankshaft, the crankshaft will rotate.

U.S. Pat. No. 5,535,709, defines an engine that is attached to a crankshaft with an off set portion. A lever attached between the piston and the crankshaft is restrained in a fulcrum regulator to provide the rotating motion to the crankshaft.

U.S. Pat. No. 4,011,842, defines a four cylinder piston engine that utilizes pistons connected to a T-shaped connecting member that causes a crankshaft to rotate. The T-shaped connecting member is attached at each of the T-cross arm to a double ended piston. A centrally located point on the T-cross arm is rotatably attached to a fixed point, and the bottom of the T is rotatably attached to a crank pin which is connected to the crankshaft by a crankthrow which includes a counter weight.

In each of the above examples, pistons are used that drive a crankshaft that has an axis transverse to the axis of the pistons.

The features and advantages of the present disclosure will be set forth in the description which follows, and in part will be apparent from the description, or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
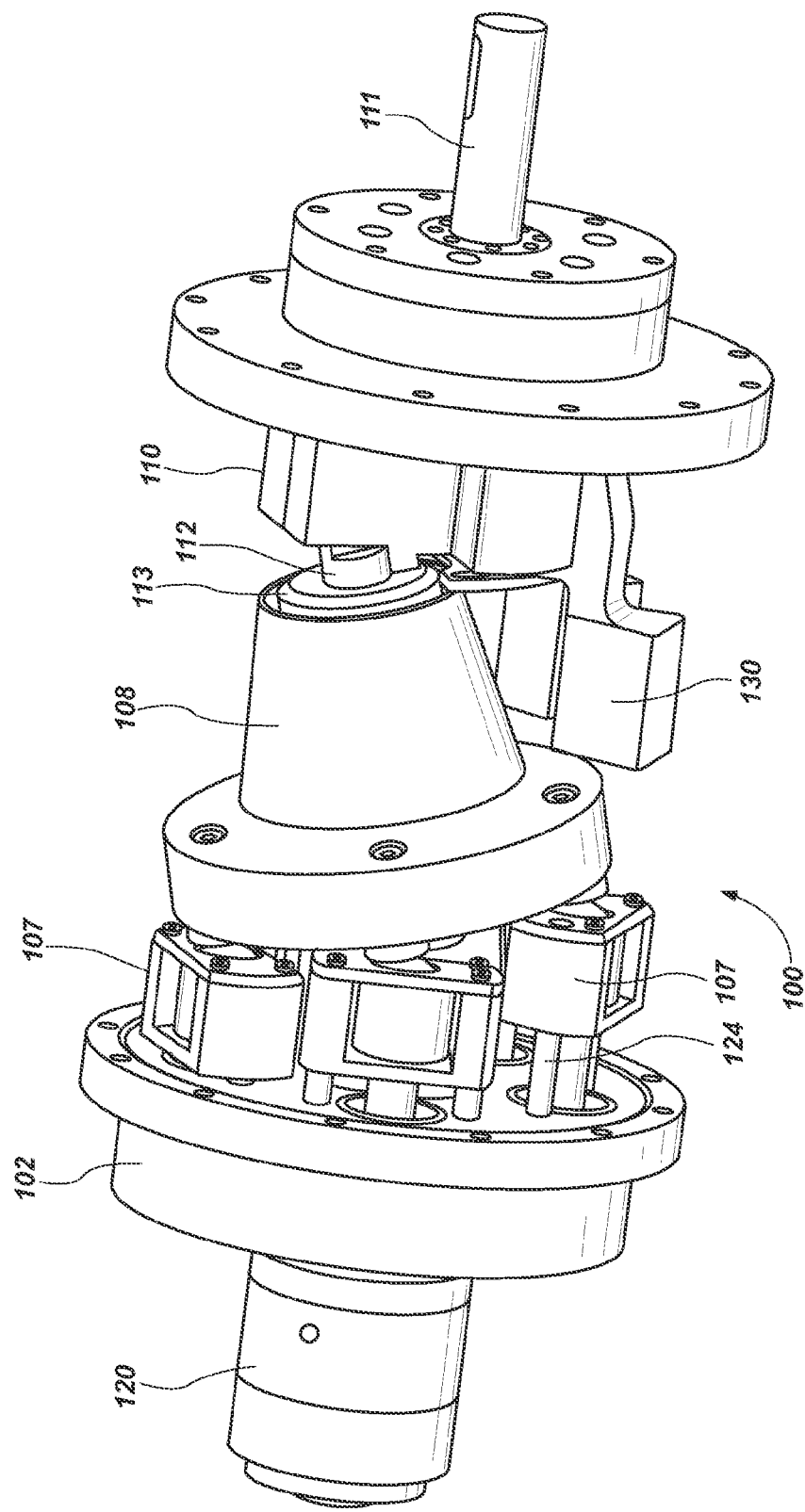
FIG. 1 is a perspective side view of a compressor embodiment of the present disclosure.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

It must be noted that, as used in this specification and the appended claims, the singular forms "a," "an," and "the" include plural referents unless the context clearly dictates otherwise.

In describing and claiming the present disclosure, the following terminology will be used in accordance with the definitions set out below.

As used herein, the terms "comprising," "including," "containing," "characterized by," and grammatical equivalents thereof are inclusive or open-ended terms that do not exclude additional, unrecited elements or method steps.

Figure 2:
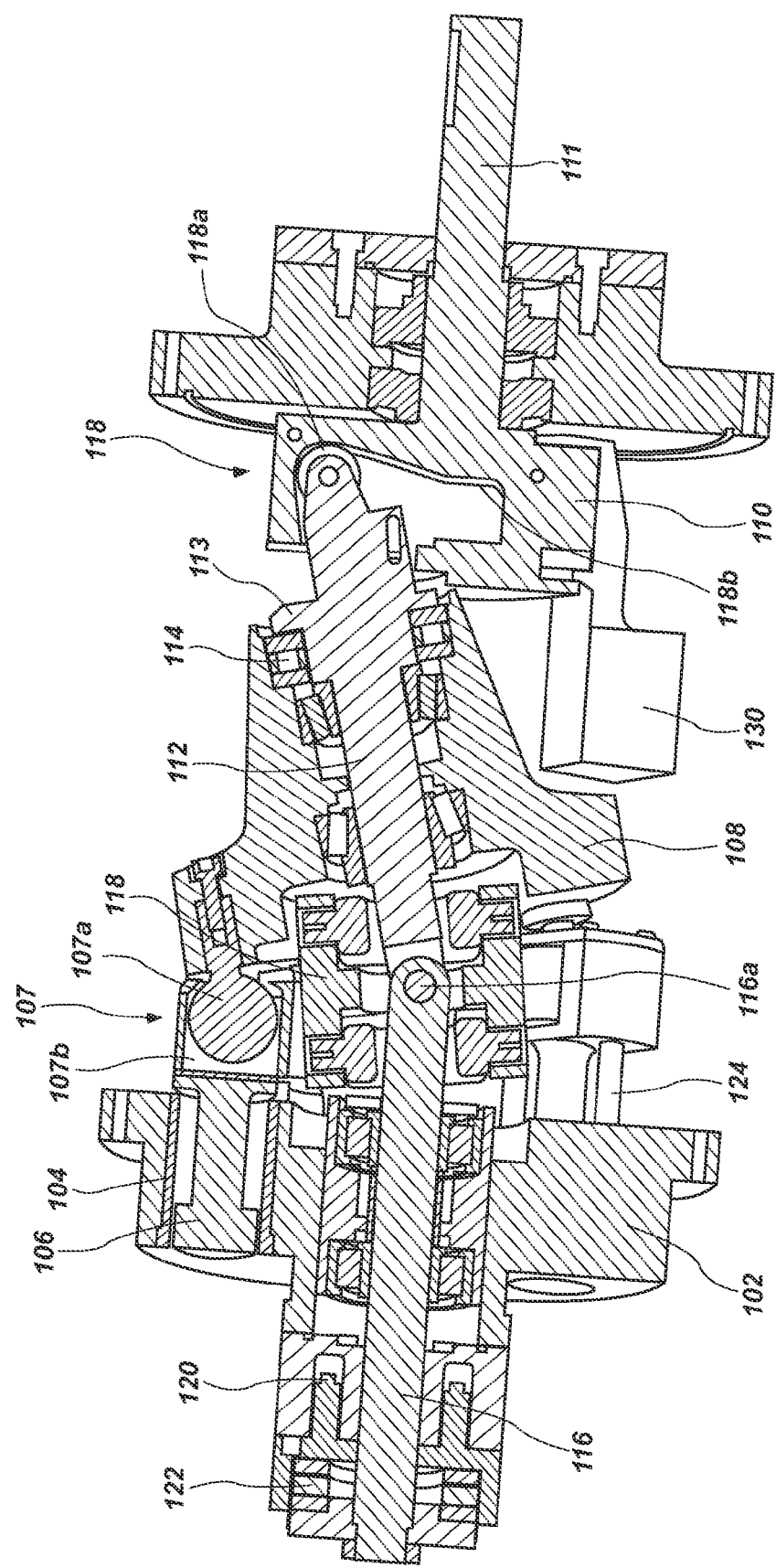
FIG. 2 is a cross-sectional view of the embodiment shown in FIG. 1.
Figure 3:
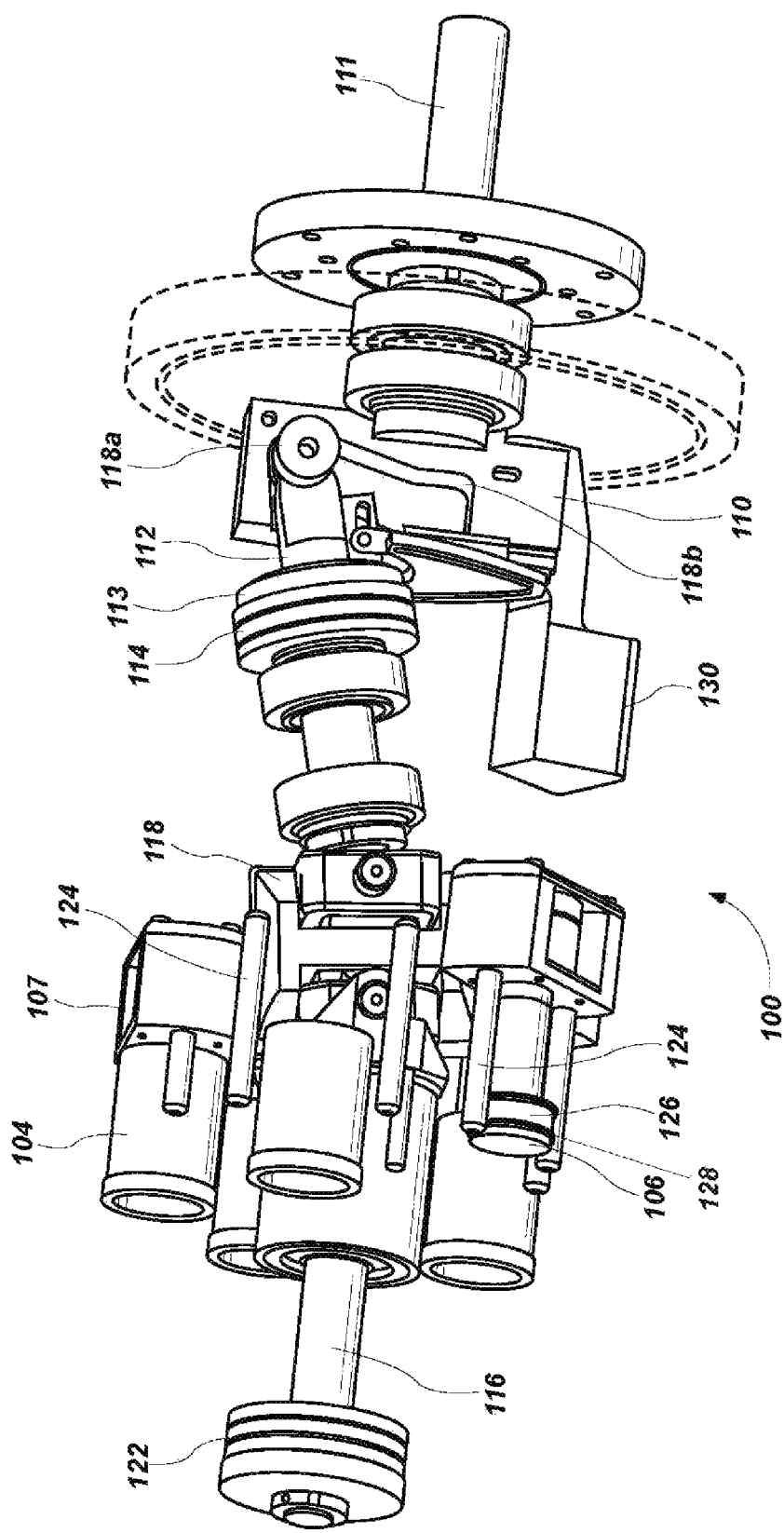
FIG. 3 is a partially disassembled perspective view of the embodiment shown in FIG. 1.

FIGS. 1-3 disclose a perspective view of a compressor, or expander depending on desired use, of the present disclosure. Compressor 100 has a cylinder block 102 housing five cylinders, although additional or fewer cylinder can be used as desired. Each cylinder 104 houses a corresponding piston 106. Each piston 106 is connected to a transition arm 108, or rocker arm, via a piston connection assembly 107. The piston connection assembly 107 includes a connector pin 107a and a socket 107b. The connector pin 107a is fixed to the transition arm. 108 and includes a ball or spherical terminating end that engages with and is retained by the socket 107b. This type of ball and socket connection enables pivoting between the transition arm 108 and the pistons 106.

The motion of the connector pin balls is a result of the wobbling action of the transition arm 108, whose motion is driven by the rotation of crank 118, and is restrained from rotation by a constant velocity joint, or double Cardan joint, 118. This causes the center of the balls of pin 107a to oscillate in a lemniscate path, which is the ideal motion of a wobble plate to prevent rotational imbalance. The piston connection assembly 107 also enables efficient transfer of the lemniscate motion of the connector pin balls 107a with respect to the pistons 106, thereby facilitating axial movement of pistons 106 within the cylinders 104. The socket 107b can also use coatings or other wear and friction-reducing material to aid in smooth operation of the pistons 106 and transition arm 108, and thereby eliminating the need for oil or other lubricant.

Nosepin shaft 112 extends through a central axis in the transition arm 108, and rotates with crank 118. Nosepin shaft 112 includes a flange 113 which can help prevent the transition arm 108 from translating axially along the nosepin shaft 112. A bearing 114 can be positioned between the nosepin shaft 112 and the transition arm 108 to reduce friction between the transition arm 108 and the nosepin shaft 112, while enabling free rotation of the nosepin shaft 112 with respect to the transition arm 108.

Nosepin shaft 112 is connected to control-shaft 116 by pin 116a. Control shaft 116 carries a tension load, and as it changes position, it causes nosepin shaft 112 and cam roller 118a to slide transversely in the cam slot 118b, changing the angle of nosepin 112, thereby changing the stroke of pistons 106 within the cylinders 104, resulting in a change in displacement.

While the cam and follower connection 118 enables a change in displacement, due to the geometry of the cam surface 118b, head clearance of the pistons 106 within the cylinders 104 can be maintained near or substantially at zero, despite varying stroke length of the pistons 106. Additionally, the head clearance can be maintained without changing position or clearance of the drive shaft 111 and the crank arm 118. Thus, variable displacement may be provided while maintaining minimal head clearance from the piston. This allows the compressor 100, or alternatively as an expander, to vary the volume flow through the compressor at constant RPM.

Variable volume displacement can have several advantages in different applications. For example, a constant pressure ratio can be maintained while varying the flow. Additionally, the pressure ratio and flow can be independently controlled enabling the pressure ratio and flow to be accommodated individually. Maintaining minimal head clearance also reduces the amount of dead space which holds gas, which maintains higher efficiency at all stroke levels. When compressor 100 is used instead as an expander, the stroke can be varied to match the desired expansion ratio and avoid "over" or "under" expanding the gas, thereby improving efficiency.

Enabling independent pressure ratio and flow changes can be advantageously utilized in, for example, heat pumps where the pressure ratio needs to change to follow the outside temperature, but the flow has to change in response to the required or desired capacity. Another use of independently changing the pressure ratio and flow may occur in a pressure reducing expander in a natural gas pipe line, for example, where the gas pressure and flow fluctuates but a constant output pressure is required or desired at the outlet of the expander.

As disclosed above, moving the control shaft 116 in an axial direction results in a change in displacement within the cylinders 104. Axial movement of control shaft 116 can be achieved by a piston actuator 120. The piston actuator 120 can be hydraulically actuated, as shown in FIGS. 1-3, or by some other desired actuation mechanism, including electrical or magnetic actuation, for example. As the piston actuator 120 is actuated, the control shaft 116 is pushed way from the compressor 100 or retracted back towards the compressor 100, thereby altering the angle between the nosepin shaft 112 and the drive shaft 111, and changing the displacement within the cylinders 104. A bearing or series of bearings 122, thrust bearings for example, may be positioned between the piston actuator 120 and the control shaft 116 to more efficiently enable the control shaft 116 to rotate independently of the piston actuator 120, reducing excessive wear. A feature of the disclosed invention is that the compression ratio can be changed while the compressor is running, by moving the control atm axially, as recited above.

Another advantage of the disclosed compressor 100 embodiment is the ability to operate with oil-free compression. This oil-free compression is enabled by the unique distribution of loads and restraint mechanisms disclosed above. The pistons 106 can be further restrained through the use of rod guides 124. The rod guides 124 can be integral with and extend from cylinder block 102. Rod guides 124 slidably engage with the sockets 107b, which can be attached to or integral with pistons 106. Alternatively, the rod guides 124 can be integral with and extend from piston connection assembly 107, such that rod guides 124 slidably engage with the cylinder block 102. Multiple rod guides 124 can be used to guide each piston 106, for example two rod guides 124 are disclosed per piston 106 in FIGS. 1-3. The rod guides 124 can constrain rotation of the pistons 106 during operation of the compressor 100 to prevent interference with other moving parts in the system and reduce extemporaneous forces between the pistons 106 and the cylinders 104 which can cause premature wear and failure. This constraining of the piston provides straight-line movement of the pistons 106 enabling a better seal without the use of oil.

Each of the pistons 106 can also include a circumferential guide 126 and a seal 128 on the terminating end of each piston 106. The piston guide 126 and seal 128 can be formed of a plastic composite or other desirable wear reducing material, for example, the same material used in the socket 107b. The use of the piston guides 126, seals 128 and the rod guides 124 facilitate the efficient use of the compressor 100 without the use of oil or other lubricants in the cylinders 104. Drive friction of the compressor 100 is proportional to stroke, unlike other convention compressors, and reduces the friction at lower stroke.

Figure 4:
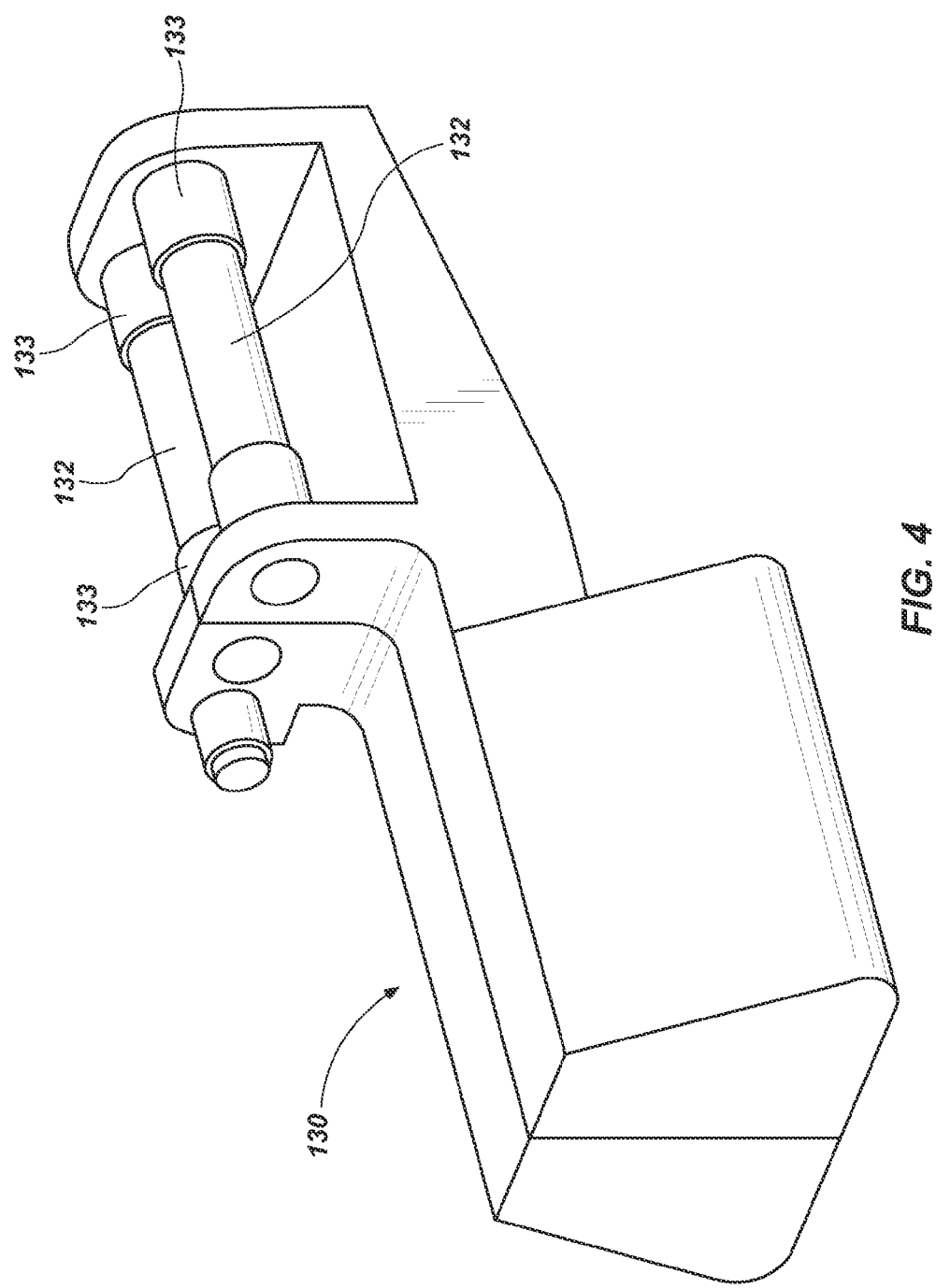
FIG. 4 is a perspective view of a disclosed embodiment of a pair of balance weights.
Figure 5:
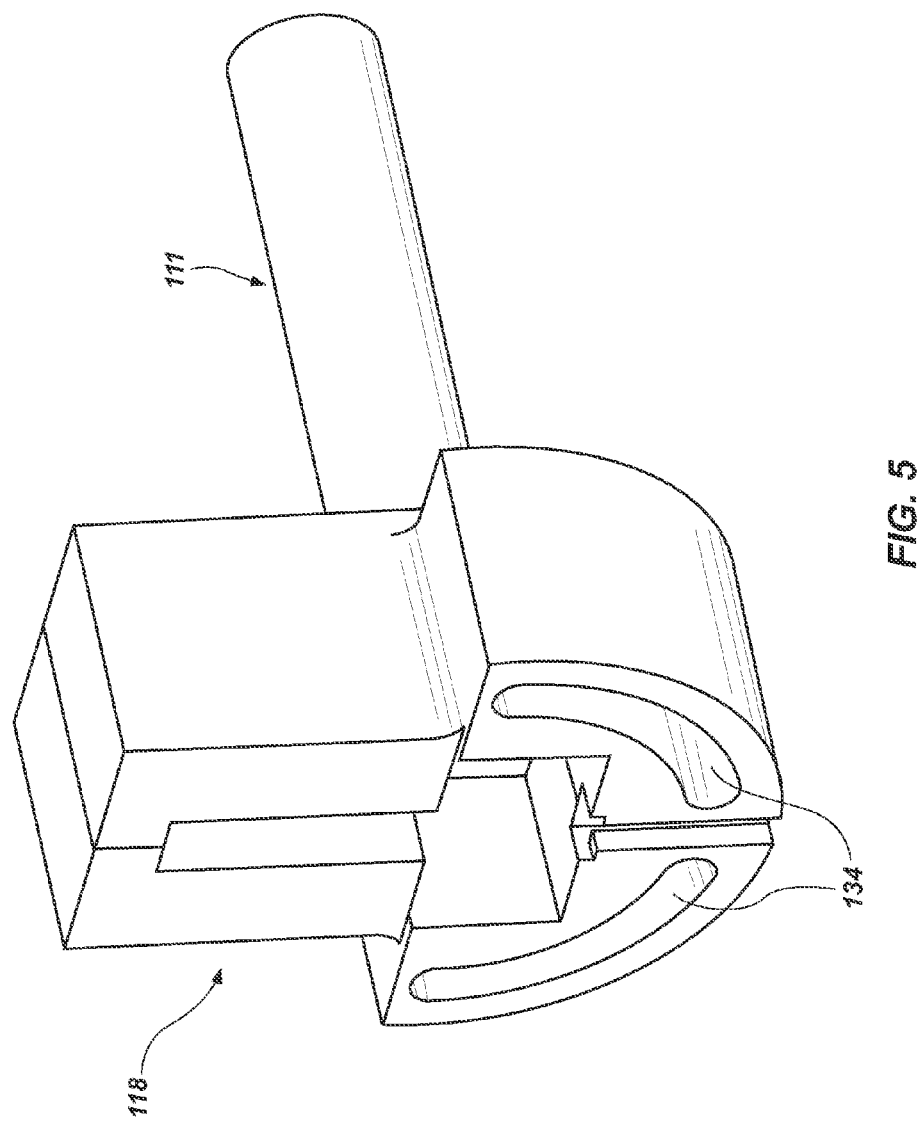
FIG. 5 is a perspective view of a disclosed embodiment of a crank arm assembly.

During operation, the transition arm 108 can generate significant centripetal forces and inertia moments that must be balanced to prevent failure of the compressor 100. A pair of balancing weights 130 can be used to balance these forces. The balancing weights 130 can be of equal weight and reflective shape to one another. Each of the weights 130 can be coupled to the crank arm 118. As shown in FIG. 4, each of the weights 130 can include a rod 132 having at least one bearing 133. The rods 132 are retained in guide slots 134 of the crank arm 118, as shown in FIG. 5. The guide slots 134 are generally semi-circular in shape, which facilitates the generally circumferential movement of the balancing weights 130 which are capable of moving with respect to one another.

Figure 6:
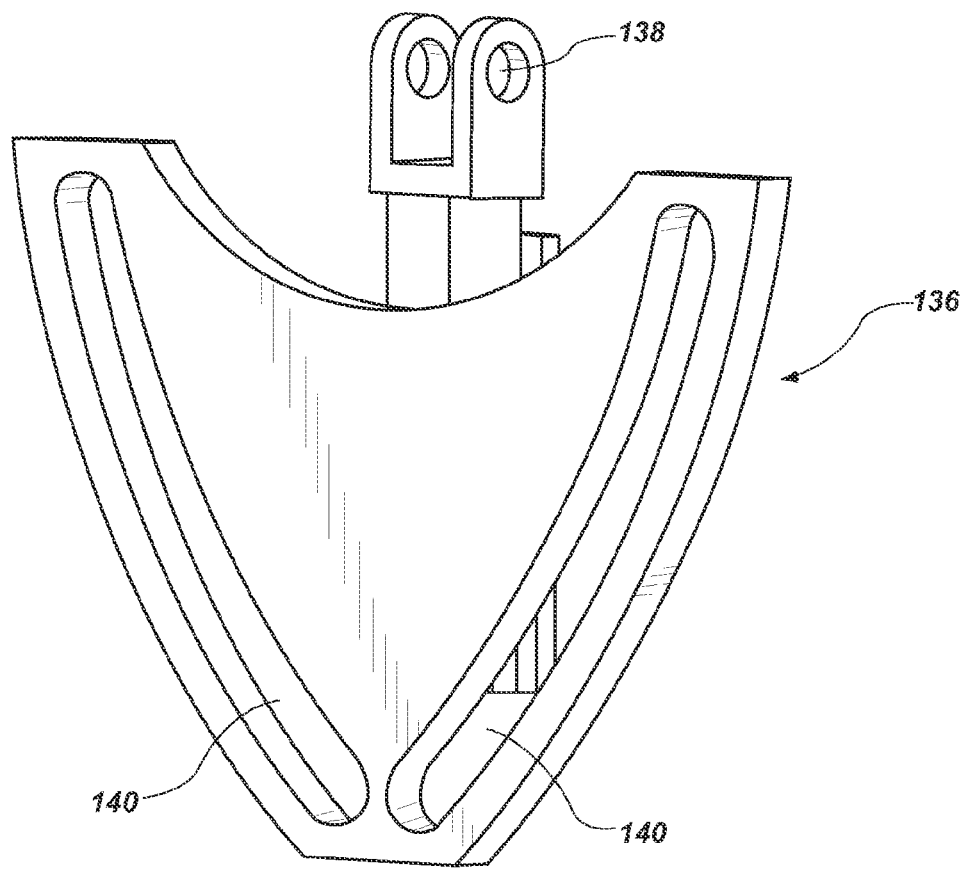
FIG. 6 is a perspective view of a disclosed embodiment of a wedge guide.

FIG. 6 discloses a wedge guide 136, which can be used to facilitate movement of the weights 130 according to the position of the nosepin shaft 112 with respect to the crank arm 118. The weights 130 extend in a generally axial direction and are positioned radially outward from the transition arm 108. The wedge guide 136 is pivotally fixed to the nosepin shaft 112 via a hinge 138. The wedge guide also includes opposing pairs of semi-circular guide slots 140 for receiving rods 132 of the weights 130. As the nosepin shaft 112 is shifted with respect to the crank arm 118 (during manipulation of the displacement) the wedge guide is likewise shifted and forces movement of the opposing weights 130.

Figure 7:
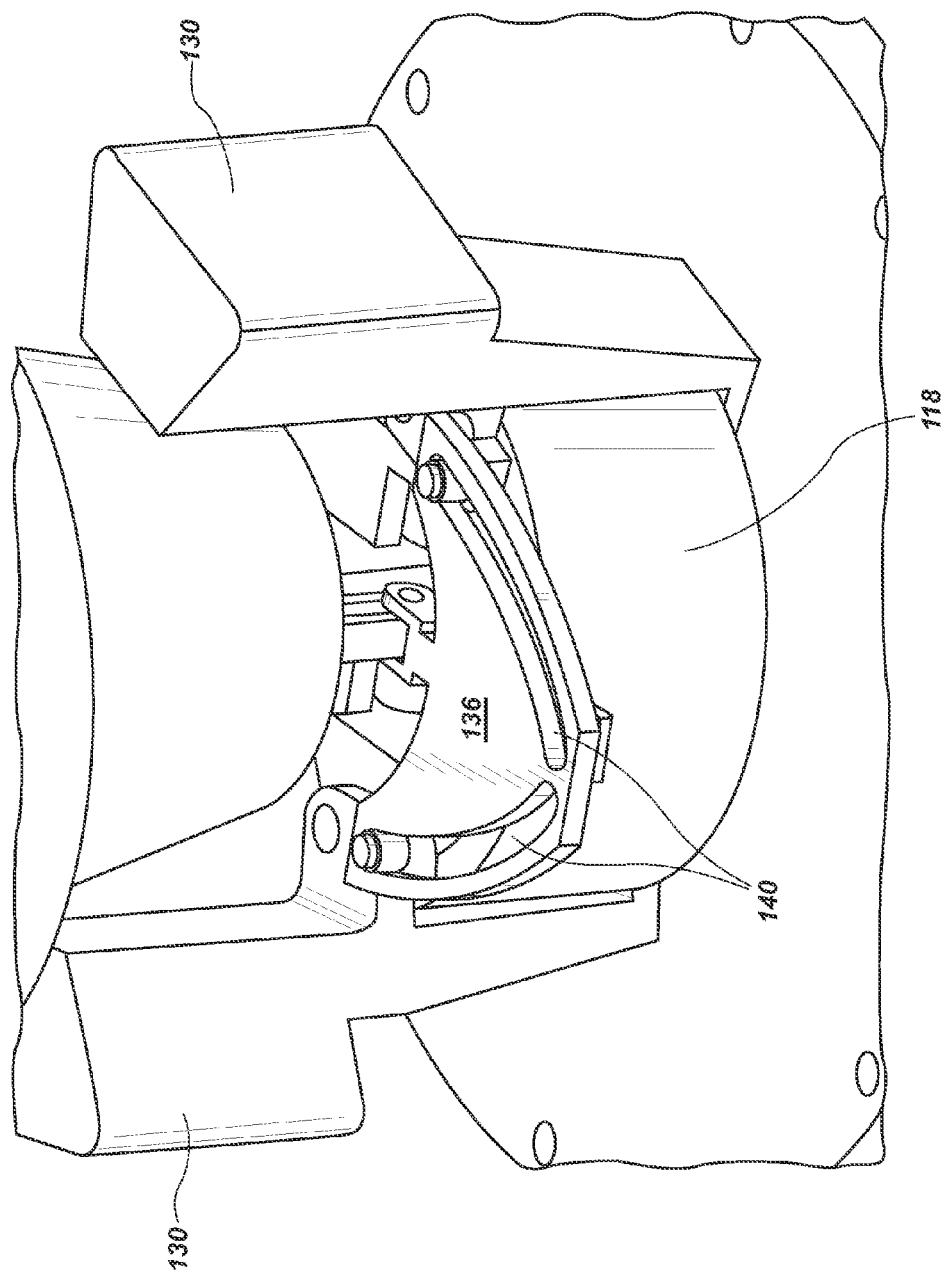
FIG. 7 is a perspective view of a disclosed embodiment of a pair of balance weights in an opposed position.
Figure 8:
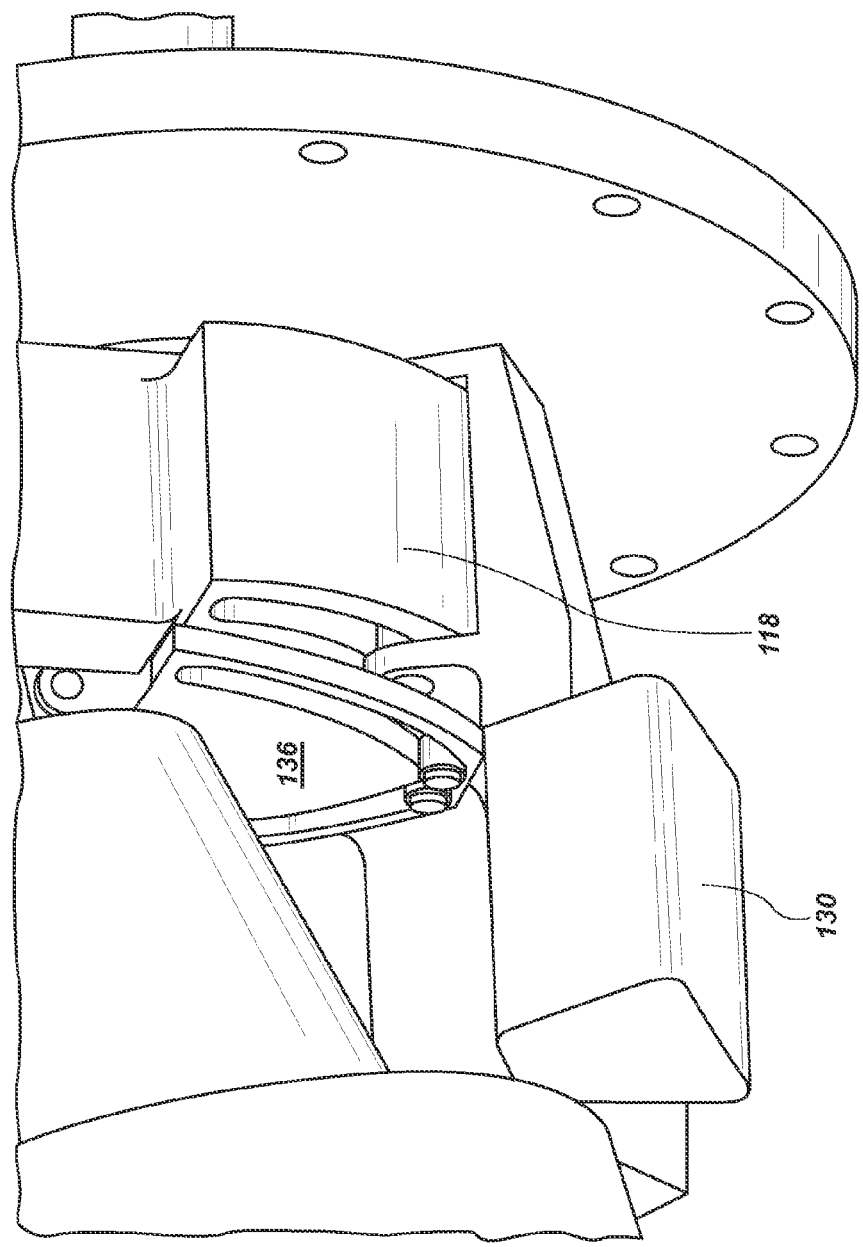
FIG. 8 is a perspective view of a disclosed embodiment of the balanced weights in a closed position.

For example, FIG. 7 discloses a position where the nosepin shaft 118 is in a first extreme position, forcing the wedge guide 136 into an extreme position causing the balancing weights 130 to move to positions directly opposed to one another. FIG. 8 discloses a position where the nosepin shaft 118 is in a second extreme position, opposite the first position, forcing the wedge guide 136 into a second extreme position causing the balancing weights 130 to meet together at a substantially common circumferential position. The positional relationship between the balancing weights 130 and the transition arm 108 is thus controlled by the corresponding guide slots 134 and 140 and the position of the wedge guide. Accordingly, proper balance is maintained in the disclosed embodiment, regardless of the manipulation of the nosepin shaft 112 or a change in displacement.

In the disclosed embodiments, each of the cylinders 104 can include input and exhaust valves (not shown) to unable desired gas to enter the cylinder 104 to be compressed and then be exhausted out of the cylinder 104. As the drive shaft 111 is rotated, generally by a motor (not shown), it causes the crank arm 118 to rotate, which forces rotation of the nosepin shaft 112. The rotation of the nosepin shaft causes lemniscate-type orbiting motion of the transition arm 108, which reciprocates the pistons 106 sequentially within the cylinders 104. Thus, transferring rotational motion of the drive shaft 111 into linear motion of the pistons 106. The disclosed compressor 100 can also be used in other applications, for example as an expander.

The principle operation of the compressor 100 can be reversed, and can be used as an engine. By utilizing combustion within the cylinders via use of a combustible fluid and spark plugs, for example, the cylinders 104 can fire the pistons 106 and facilitate movement of the transition arm 108 which can be converted to movement rotation of the drive shaft 111 in the opposite direction as discussed above.

The present disclosure may include a variable compression piston assembly, including a plurality of cylinders, each cylinder having an axis substantially parallel to the axis of the other cylinders; a plurality of pistons, one piston in each cylinder, and each piston and corresponding cylinder having a displacement; a transition arm having a connector pin for each piston, each connector pin connecting each piston to said transition arm; a drive shaft connected to the transition arm; and a control shaft rotatably coupled to the drive shaft, the control shaft being movable to adjust the displacement of the piston assembly.

An embodiment of the variable compression assembly may also include an axis of the control shaft is substantially parallel with the drive shaft and the assembly operates with oil free compression.

An embodiment of the variable compression assembly may also include a nosepin shaft connected to said transition arm; and a crank arm fixed to said drive shaft, the nosepin shaft connected to the crank arm via a cam connection and the nosepin shaft includes a follower at a terminal end thereof that engages with a cam slot of the crank arm. The nosepin shaft can also be connected to said control shaft via a universal joint. Each of said pistons can be connected with said corresponding connector pins via ball joints. Additionally each of said pistons includes a socket to receive a ball fixed to said corresponding connector pins, said sockets having a low wear and friction coating. Each of the plurality of pistons can be slidably engaged with at least one guide rod, a longitudinal axis of the guide rod being substantially parallel with a longitudinal axis of the plurality of cylinders. The control shaft can be configured to move axially, and said control shaft can be actuated by engagement with an actuator piston. The actuator piston can be hydraulically operated.

An embodiment of the variable compression assembly may also include a pair of balancing weights connected to said crank arm to balance centripetal forces generated by said transition arm. The balancing weights can be moveable with respect to one another. The balancing weights can also be located radially outward from the transition arm. The distance between the balancing weights can increase as the angle between said nosepin shaft and said drive shaft decreases. Additionally, lateral movement of said nosepin shaft toward the balancing weights can bias them apart from one another. Each of said balancing weights includes a rod that engages a guide member fixed to the nosepin shaft, the guide member facilitating movement of the balancing weights along a predetermined path. And each of said pistons can include a socket to receive a ball fixed to said corresponding connector pins, said sockets having a low wear and friction coating.

A method for varying the displacement of a piston assembly can include providing a plurality of pistons coupled to corresponding cylinders and forming a compression ratio, a transition arm coupled to each of the pistons, a nosepin shaft coupled to the transition arm and rotationally coupled with a control shaft, and a drive shaft rotationally coupled to the nosepin shaft and configured for sliding lateral movement with respect to the nosepin shaft, and moving said control shaft in an axial direction, to change the displacement of the piston assembly.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A variable compression piston assembly, comprising:
   a plurality of cylinders, each cylinder having an axis substantially parallel to the axis of the other cylinders;
   a plurality of pistons, one piston in each cylinder, and each piston and corresponding cylinder having a displacement;
   a transition arm having a connector pin for each piston, each connector pin connecting each piston to said transition arm;
   a drive shaft connected to the transition arm; and
   a control shaft rotatably coupled to the drive shaft, the control shaft being movable to adjust the displacement of the piston assembly;

a nosepin shaft connected to said transition arm, wherein said nosepin shaft is directly connected to said control shaft via a universal joint; and a crank arm fixed to said drive shaft, the nosepin shaft connected to the crank arm via a cam connection, wherein the crank arm includes a cam slot that receives the nosepin shaft.

2. The assembly of claim 1 wherein, an axis of the control shaft is substantially parallel with the drive shaft.

3. The piston assembly of claim 1, wherein the assembly operates with oil free compression.

4. The piston assembly of claim 1, wherein said nosepin shaft includes a follower at a terminal end thereof that engages with the cam slot of the crank arm.

5. The piston assembly of claim 1, each of said pistons is connected with said corresponding connector pins via ball joints.

6. The piston assembly of claim 5, wherein each of said pistons includes a socket to receive a ball fixed to said corresponding connector pins, said sockets having a low wear and friction coating.

7. The piston assembly of claim 1, wherein each of the plurality of pistons is slidably engaged with at least one guide rod, a longitudinal axis of the guide rod being substantially parallel with a longitudinal axis of the plurality of cylinders.

8. The piston assembly of claim 1, wherein said control shaft is configured to move axially, and said control shaft is actuated by engagement with an actuator piston.

9. The piston assembly of claim 8, wherein the actuator piston is hydraulically operated.

10. The piston assembly of claim 1, further comprising:
a pair of balancing weights connected to said crank arm to balance centripetal forces generated by said transition arm.

11. The piston assembly of claim 10, wherein the balancing weights are moveable with respect to one another.

12. The piston assembly of claim 10, wherein the balancing weights are located radially outward from the transition arm.

13. The piston assembly of claim 10, wherein the distance between the balancing weights increases as the angle between said nosepin shaft and said drive shaft decreases.

14. The piston assembly of claim 10, wherein lateral movement of said nosepin shaft toward the balancing weights biases them apart from one another.

15. The piston assembly of claim 10, wherein each of said balancing weights includes a rod that engages a guide member fixed to the nosepin shaft, the guide member facilitating movement of the balancing weights along a predetermined path.

16. A variable compression piston assembly, comprising:
a plurality of cylinders, each cylinder having an axis substantially parallel to the axis of the other cylinders;
a plurality of pistons, one piston in each cylinder;
a transition arm connected to each piston;
a drive shaft connected to the transition arm;
a control shaft rotatably coupled to the drive shaft,
a nosepin shaft connected to said transition arm, wherein said nosepin shaft is directly connected to said control shaft via a universal joint;
a crank arm fixed to said drive shaft, the nosepin shaft connected to the crank arm via a cam connection, wherein the crank arm includes a cam slot that receives the nosepin shaft; and a pair of balancing weights connected to said drive shaft to balance centripetal forces generated by the transition arm, wherein the balancing weights are moveable with respect to one another.

17. The assembly of claim 16, wherein the control shaft being movable to adjust the displacement of the piston assembly.

18. The assembly of claim 17, wherein, an axis of the control shaft is substantially parallel with the drive shaft.

19. The piston assembly of claim 17, wherein said control shaft is configured to move axially, and said control shaft is actuated by engagement with an actuator piston.

20. The piston assembly of claim 19, wherein the actuator piston is hydraulically operated.

21. The piston assembly of claim 16, wherein the assembly operates with oil free compression.

22. The piston assembly of claim 16, wherein said nosepin shaft includes a follower at a terminal end thereof that engages with the cam slot of the crank arm.

23. The piston assembly of claim 16, each of said pistons is connected with corresponding connector pins via ball joints.

24. The piston assembly of claim 23, wherein each of said pistons includes a socket to receive a ball fixed to said corresponding connector pins, said sockets having a low wear and friction coating.

25. The piston assembly of claim 16, wherein each of the plurality of pistons is slidably engaged with at least one guide rod, a longitudinal axis of the guide rod being substantially parallel with a longitudinal axis of the plurality of cylinders.

26. The piston assembly of claim 16, wherein the balancing weights are located radially outward from the transition arm.

27. The piston assembly of claim 16, wherein the distance between the balancing weights increases as the angle between said nosepin shaft and said drive shaft decreases.

28. The piston assembly of claim 16, wherein lateral movement of said nosepin shaft toward the balancing weights biases them apart from one another.

29. The piston assembly of claim 16, wherein each of said balancing weights includes a rod that engages a guide member fixed to the nosepin shaft, the guide member facilitating movement of the balancing weights along a predetermined path.

30. A method for varying the displacement of a piston assembly, comprising:
providing a plurality of pistons coupled to corresponding cylinders and forming a compression ratio, a transition arm coupled to each of the pistons, a nosepin shaft coupled to the transition arm and rotationally and directly coupled with a control shaft, and a drive shaft rotationally coupled to the nosepin shaft and configured for sliding lateral movement with respect to the nosepin shaft, a crank arm fixed to said drive shaft, the nosepin shaft connected to the crank arm via a cam connection, wherein the crank arm includes a cam slot that receives the nosepin shaft, and moving said control shaft in an axial direction, to change the displacement of the piston assembly.

* * * * *